United States Patent [19]

Lifshitz et al.

[11] 4,382,768
[45] May 10, 1983

[54] APPARATUS FOR MAKING DOUGH ENVELOPES CONTAINING FILLING

[76] Inventors: Igor Lifshitz, 1635 N. Martel, #316, Los Angeles, Calif. 90046; Mikhail Kirakuperman, 7538 Irvine, North Hollywood, Calif. 91605

[21] Appl. No.: 201,224

[22] Filed: Oct. 27, 1980

Related U.S. Application Data

[63] Continuation-in-part of Ser. No. 965,521, Dec. 1, 1978.

[51] Int. Cl.³ .............................. A23L 1/16; B29C 1/00
[52] U.S. Cl. .................................. 425/510; 249/119; 249/129; 249/132; 249/134; 425/512; 425/292; 425/298; 425/306; 425/324.1
[58] Field of Search ............... 249/119, 129, 132, 120; 264/138, 153, 163; 30/315, 316, 357; 426/282, 283, 275, 274, 503, 502, 512; 425/510, 306, 310, 324.1, 292, 298, 300; 99/450.1, 450.3, 450.4, 450.2, 450.5, 450.6

[56] References Cited

U.S. PATENT DOCUMENTS

| | | | |
|---|---|---|---|
| 337,329 | 3/1886 | Hewett | D7/43 |
| 1,477,693 | 12/1923 | Clark | D7/43 |
| 1,573,577 | 2/1926 | Roberts | 425/510 |
| 1,793,263 | 2/1931 | Trop | 99/450.2 |
| 1,844,142 | 2/1932 | Barili | 90/450.2 |
| 1,945,755 | 2/1934 | Scruggs, Jr. | 425/298 |
| 2,138,247 | 11/1938 | Tatosian | 426/283 |
| 2,163,579 | 6/1939 | Bianchi | 426/283 |
| 2,186,451 | 1/1940 | Dutcher | 264/163 |
| 2,195,424 | 4/1940 | Raiche | 264/163 |
| 2,386,993 | 10/1945 | Valdastri | 426/283 |
| 3,026,822 | 3/1962 | Gatti | 99/450.6 |
| 3,115,164 | 12/1963 | Vanderbilt | 156/184 |
| 3,234,895 | 2/1966 | Leiby | 426/503 |
| 3,456,300 | 7/1969 | Pickett | 249/134 |
| 3,475,521 | 10/1969 | Stroop | 264/153 |
| 3,872,757 | 3/1975 | Hargadon | 425/298 |
| 4,075,359 | 2/1978 | Thulin | 426/502 |
| 4,112,127 | 9/1978 | Popeil | 426/92 |

FOREIGN PATENT DOCUMENTS

| | | | |
|---|---|---|---|
| 203375 | 1/1956 | Australia | |
| 508456 | 1/1955 | Italy | 99/450.6 |

OTHER PUBLICATIONS

Roberts is Cited as of Interest for Disclosing a Mold Similar to Applicants'.
B & C are Cited as of Interest.

Primary Examiner—Willard E. Hoag
Attorney, Agent, or Firm—Poms, Smith, Lande & Rose

[57] ABSTRACT

An improved apparatus for making dough envelopes containing filling. The apparatus is molded from plastic and includes a frame structure having a plurality of interconnected hexagonal molds so as to form a honeycomb type structure. Each hexagonal mold includes six inclined cutting edges which are connected around a central inverted conical chamber. The inverted conical chamber partially supports the dough envelope during formation to produce uniformly shaped and aesthetically pleasing envelopes. Further, horizontal pasting faces are provided in the corners of each mold between the conical chamber base and cutting edges lower edges. These horizontal pasting faces in combination with the cutting edges provide a strong and uniform seal around the dough envelope edges.

16 Claims, 22 Drawing Figures

1. A SECTION WITH A ROUND EDGE-KNIFE FOR MAKING ONE DOUGH PRODUCT

1. FOR EACH PRODUCT IS CUT TWO CIRCLES OF DOUGH SEPARATLY.

2. ON THE TOP OF EACH CIRCLE, RIGHT IN THE CENTER, IS PUT A FILLING.

3. OVER EACH CIRCLE WITH THE FILLING IS PLACED THE TOP DOUGH CIRCLE.

4. EACH PRODUCT IS PASTED SEPARATLY BY HANDS, ALONG THE CIRCLE.

1. A SECTION WITH A ROUND EDGE-KNIFE FOR MAKING ONE DOUGH PRODUCT

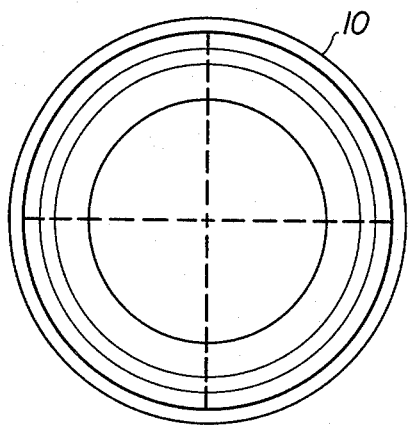
1. FIG. 7
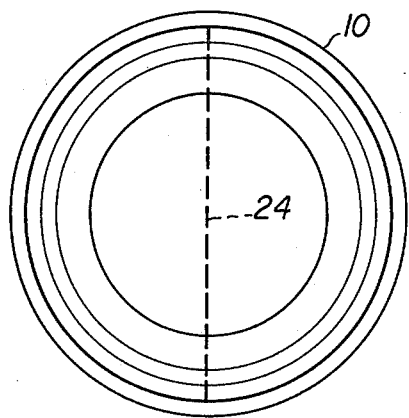
2. FIG. 8
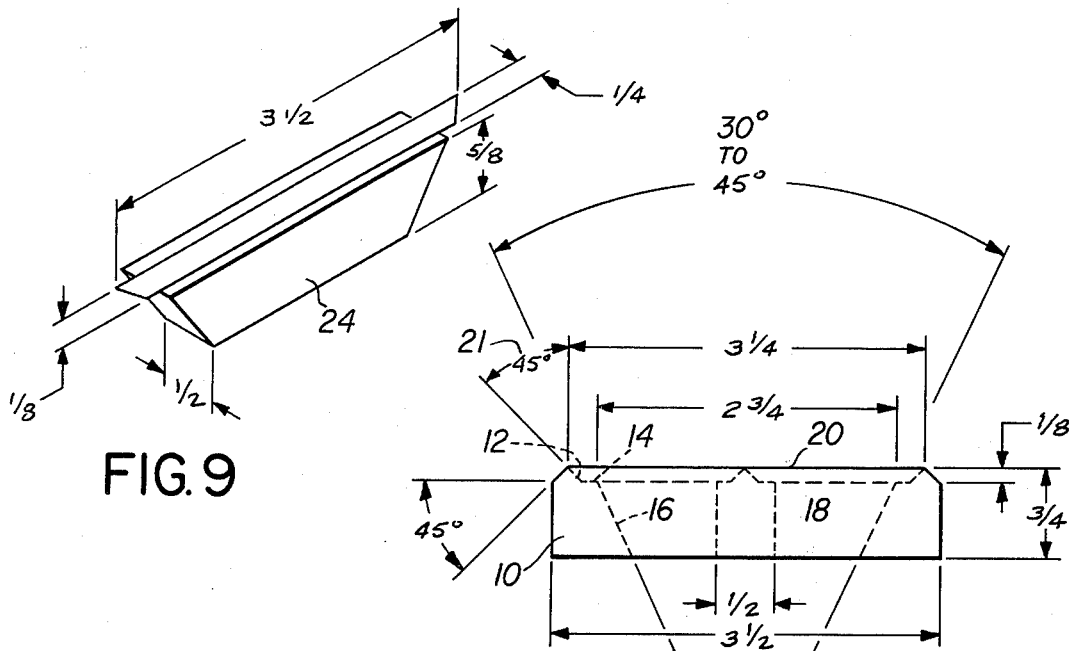
FIG. 9
FIG. 10
1. A SECTION WITH TWO CENTRAL KNIFES, MAKING FOUR DOUGH PRODUCTS
2. A SECTION WITH ONE CENTRAL KNIFE, MAKING TWO DOUGH PRODUCTS 1. A ROUND EDGE-KNIFE
2. A PLACE FOR PASTING
3. CONE-SHAPED DEEPENING FOR FORMING OF DOUGH PRODUCTS
4. THE CENTRAL KNIFE
5. THE SIDE OF THE KNIFE UNDER THE INCLINATION OF 45 DEGREES
6. AN INSIDE ANGLE OF 90 DEGREES
7. THE BASE OF THE KNIFE
8. THE BASE OF THE SECTION

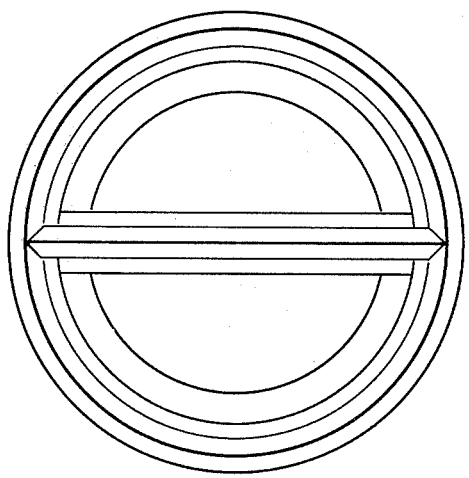
1. FIG. 13
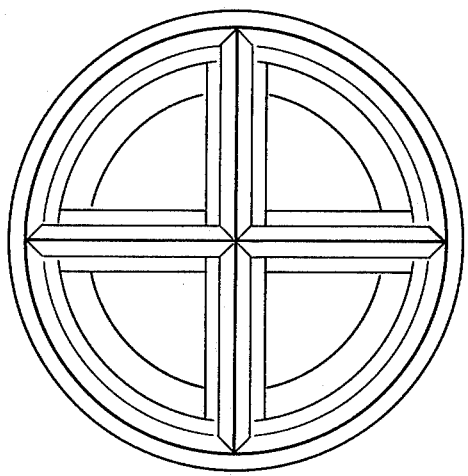
2. FIG. 14
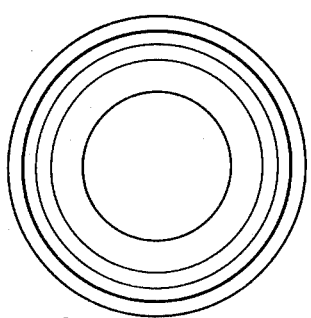
3. FIG. 15
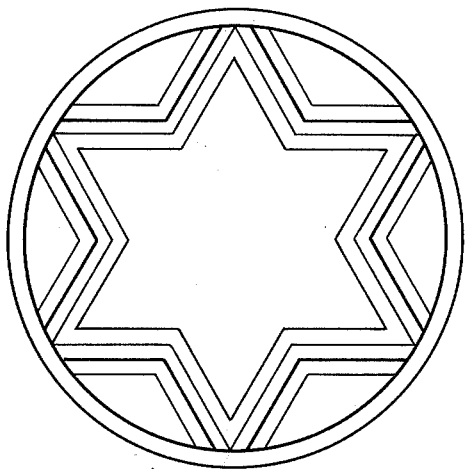
4. FIG. 16
1. A SECTION WITH ONE CENTRAL KNIFE FOR TWO PRODUCTS
2. A SECTION WITH TWO CENTRAL KNIFES FOR FOUR PRODUCTS
3. A SECTION FOR MAKING A ROUND-SHAPED RAVIOLI
4. A SECTION FOR MAKING KOSHER CREPLICH

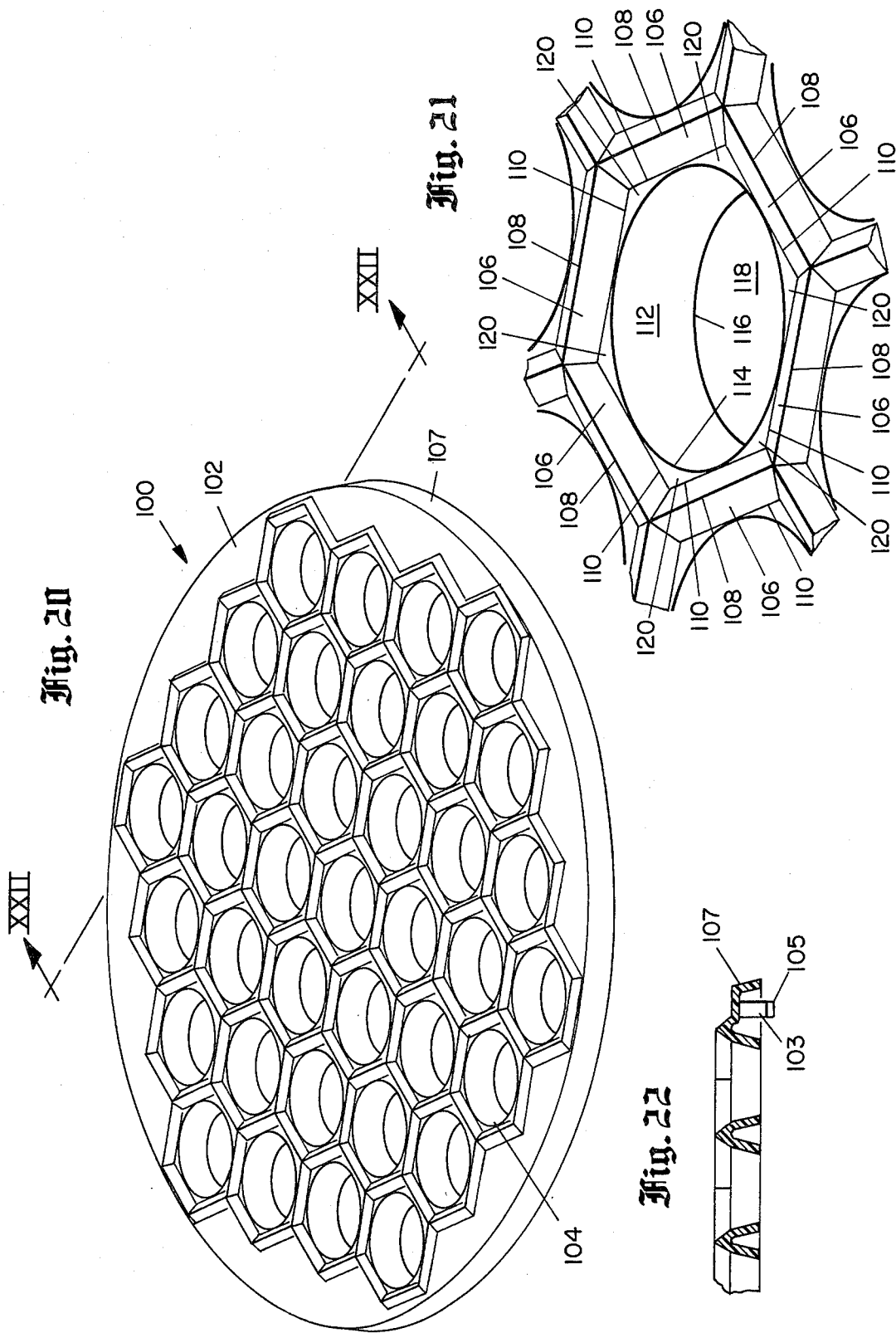

APPARATUS FOR MAKING DOUGH ENVELOPES CONTAINING FILLING

This application is a continuation-in-part application of co-pending application Ser. No. 965,521 filed Dec. 1, 1978 and entitled MAGIC PRESS FORM FOR PASTING DOUGH.

BACKGROUND OF THE INVENTION

The present invention relates generally to apparatus and methods for simply and rapidly producing filled pastries or other dough products. More particularly, the present invention relates to methods and apparatus for producing dough envelopes containing filling.

Filled pastries or other dough products such as hor d'oeuvres, ravioli, creplich, won ton, and empanada are well-known and enjoyed by many individuals. These types of products are all commonly characterized by their use of a dough envelope containing a desired filling. For small scale production of these dough envelopes which contain filling, the usual technique involved cutting out individual pieces of dough, placing a desired filling on top of a bottom layer of dough, placing a top layer of dough over the filling and then pinching the edges of the two dough layers together to form a dough envelope containing the filling. This old-fashioned method for producing dough envelopes containing filling is quite time-consuming, tedious and is not adaptable to production of substantial numbers of the dough covered delicacies.

Therefore, in order to accommodate individuals desiring to make more than just a few raviolis etc., there have been prior art attempts to provide a suitable apparatus and method which will produce reasonably large quantities of such products. One such prior art attempt is the method and apparatus for making ravioli disclosed in U.S. Pat. No. 2,386,993 issued to Valdastri on Oct. 16, 1945. The apparatus as disclosed in Valdastri U.S. Pat. No. 2,386,993 issued to Valdastri on Oct. 16, 1945. The apparatus as disclosed in Valdastri includes a frame structure having a number of interconnected molds. To make ravioli, a first layer of dough is placed over the frame structure. Then individual portions of filling are placed on top of the dough above each mold. A second dough layer is placed over the first dough layer and filling portions. At this point, a rolling pin is utilized to apply pressure to the dough layers and filling. As the rolling pin is rolled over the frame, the dough layers and filling are forced into the molds. Each of the molds has a central opening with vertical side walls for receiving the dough envelopes as pressure is applied from above. A rectangularly shaped slanted face is provided at the top of each mold opening. The slanted faces are provided with grooves or teeth which are included, purportedly to enhance the sealing or pasting of the dough layers together. The top edges of the slanted surfaces form cutting edges which cut the dough layers into the desired individual envelopes as pressure is applied to the dough layers.

Although the Valdastri patent purports to disclose an apparatus and method for mass producing dough envelopes containing filling, the actual structure of the molds causes inherent problems in envelope formation. Specifically, first the walls of the mold openings are vertical; and secondly, the surfaces which are intended to secure or paste the two layers of dough together are slanted at substantial angle to the horizontal. As a result, there is no support for the dough envelopes as they are pressed into the opening and filled. Consequently, the lower dough layer may be uncontrollably deformed due to variations in filling amounts and consistencies. Without supporting the dough envelopes, production of unsightly and non-uniform dough products is likely. In addition, as the dough products drop through the mould of Valdastri, the edges of the dough products are bent up and the combination of the slanted pasting surfaces and the subsequent deformation of the edges of the products means that the pastries, ravioli or other products will be irregularly pasted together around the edges, with the filling often exposed, and neat, regular, dough-covered products will not be produced.

It would therefore be desirable to provide an apparatus and method for mass producing dough envelopes having structurally uniform characteristics to prevent weakening of the dough envelope adjacent and at the envelope seals and further where the shape of the dough envelopes is controlled to produce a uniformly shaped pastry not having unsightly bumps, wrinkles or stretch marks.

SUMMARY OF THE INVENTION

In accordance with the present invention, an improved apparatus and method is provided for producing dough envelopes containing filling wherein the steps of using the apparatus do not result in weakening or rupturing of the dough directly adjacent the edges. The edge seals themselves are also improved. Further, the present invention provides for production of uniformly shaped dough envelopes containing filling, which are uniform in appearance and appetizing in appearance.

The present invention includes a frame having a plurality of molds. Support walls are provided surrounding the mold opening to form an inverted frustum or conical chamber below the pasting faces. This inverted frustum chamber receives and partially supports the dough envelope during pasting of the dough layers together.

As one feature of the present invention, the partial support provided to the dough layers by the support walls prevents structure weakening along the sealed edges. A further feature of the tapered design of the cone chamber is the production of uniformly shaped dough envelopes with the shape of the envelope being determined by how far down the support cone the envelope is forced during sealing and cutting operations.

The cutting surfaces or edges in accordance with the present invention are inclined at a suitable angle and connected together to form a regular hexagon. The cutting edges not only cut the dough, but also serve as pasting facees. The top of the inverted conical chamber fits within the regular hexagon so that horizontal pasting faces are provided in each corner of the hexagon between the base of the cone and the lower edges of the cutting edges. The pasting faces provide a sealing surface which in combination with the cutting edges insures a tight and durable seal while not causing any appreciable weakening of the dough layers.

As an additional feature of the present invention the cutting edges, pasting faces and support walls are molded economically into a plastic honeycomb structure which not only is inexpensive to produce, but also minimizes dough loss during envelope formation. The angles and configuration of the apparatus are such that plastic molding operations are made particularly convenient, simple and economical.

In accordance with one specific illustrative embodiment of the invention, an apparatus for forming dough-covered food products includes a frame containing a series of mold openings with support walls surrounding the mold opening forming an inverted frustum or conical chamber. At the mouth of the mold openings are substantially horizontal surfaces. Extending upward from the horizontal surfaces are angled cutting surfaces or edges. Preferably the mold openings are circular and the cutting edges form a series of regular polygons, preferably hexagonal in configuration. The included angle of the cutting edges is between 60 degrees and 120 degrees and preferrably on the order of 90 degrees, and the conical openings have an included angle of between 20 and 60 degrees, preferably about 30 to 45 degrees.

Advantages of the proposed configuration include the natural presence of a set of horizontal pasting surfaces between the circular mold openings and the hexagonal cutting ridges; and the ease in fabrication of the apparatus by plastic injection molding, with the conical surfaces of the dough molding openings permitting easy separation of the injection molds to remove the parts.

These and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 7 is a top view of the mold shown in FIG. 5 with dotted lines indicating diagonal cross piece cutter blades.

FIG. 8 is also a top view of the mold shown in FIG. 5 with only 1 diagonal cross cutter blade represented.

FIG. 9 is a plan view showing the structure of the diagonal cutters as used in FIGS. 7 and 8.

FIG. 10 is a side view of FIG. 8 showing the diagonal cutter in phantom.

FIG. 13 is the same as FIG. 8 except that the cutter blade is shown in detail rather than in phantom lines.

FIG. 14 is the same as FIG. 7 except the cutter blades are shown in detail rather than in phantom lines.

FIG. 15 is a top view of an exemplary round shaped ravioli mold.

FIG. 16 is an exemplary mold for making kosher creplich.

FIG. 20 is the preferred exemplary frame structure with a plurality of preferred exemplary molds.

FIG. 21 is a detailed view of a preferred mold.

FIG. 22 is a view taken along the XXII—XXII section line of FIG. 20.

DETAILED DESCRIPTION OF EXEMPLARY EMBODIMENTS

Figure 1:
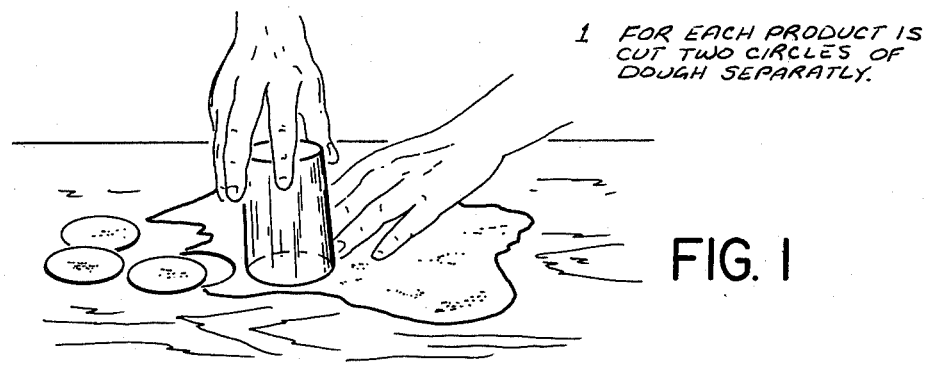
FIGS. 1, 2, 3 and 4 depict a typical prior art method for forming dough envelopes containing filling on an individual basis.
Figure 2:
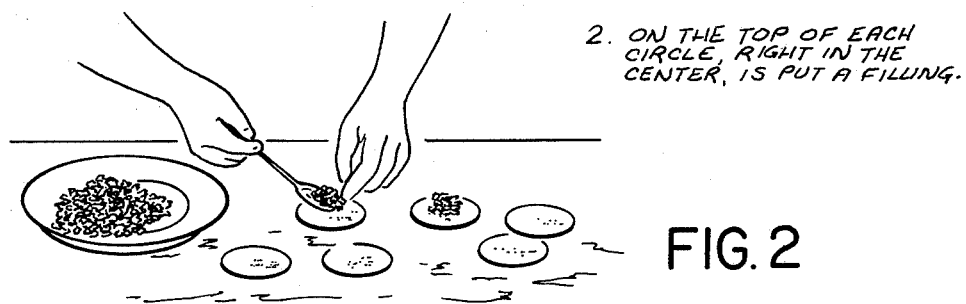
Figure 3:
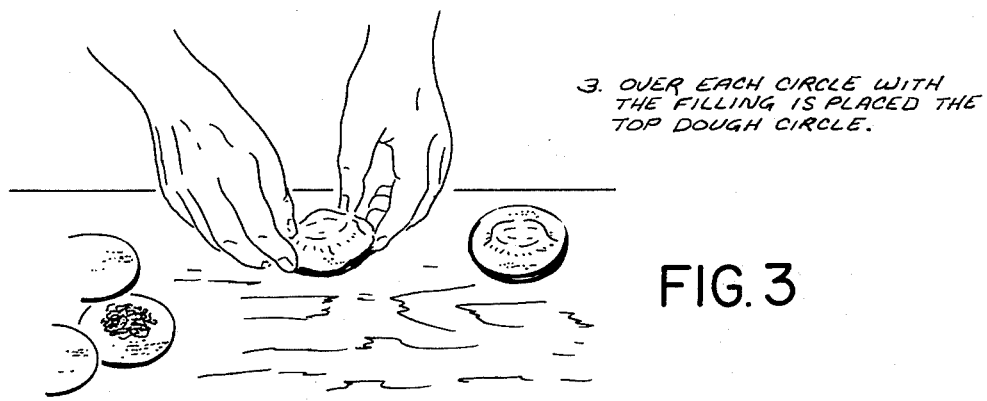
Figure 4:
Figure 5:
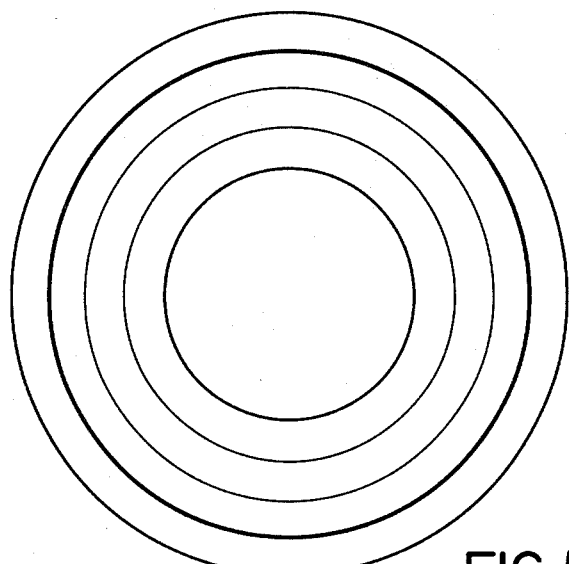
FIG. 5 is a top view of an exemplary mold in accordance with the present invention.

By way of background, FIGS. 1 through 4 depict the time consuming prior art technique of individually forming dough envelopes containing filling. FIG. 1 shows the initial step of forming individual dough layers by the use of a single mold such as a glass or other suitable mold. FIG. 2 shows the second step in this prior art process involving the placement of a desired filling onto each individual piece of dough. FIG. 3 additionally shows the third step in which a top layer of dough is placed over the bottom dough piece having the filling thereon with FIG. 4 showing the time consuming hand pasting of the dough edges to form the final dough envelope.

Figure 6:
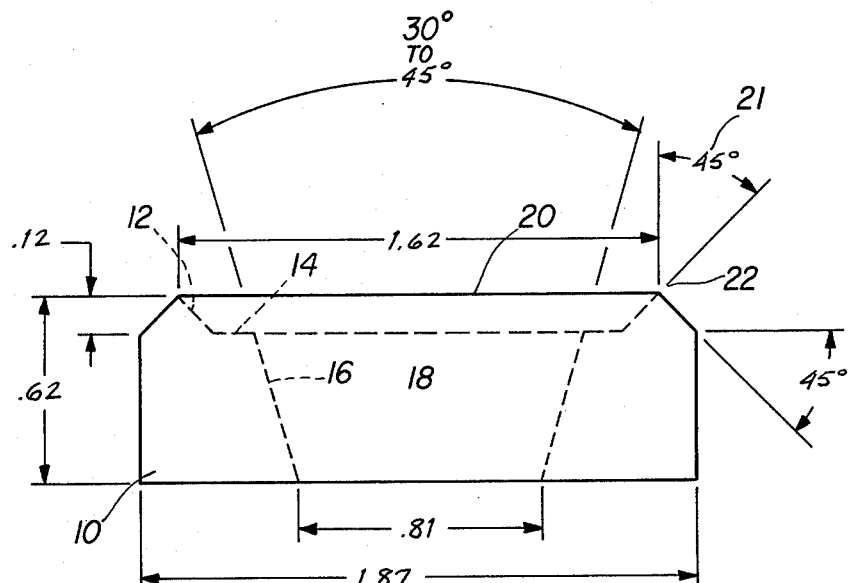
FIG. 6 is a side view of FIG. 5.
Figure 11:
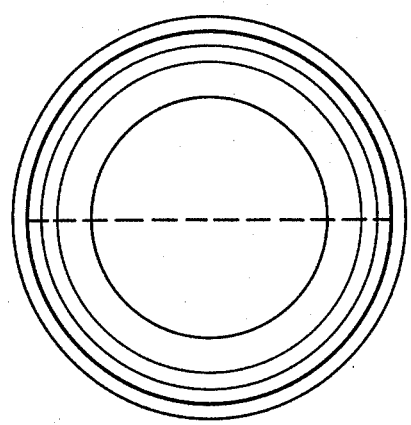
FIG. 11 is the same as FIG. 8.
Figure 12:
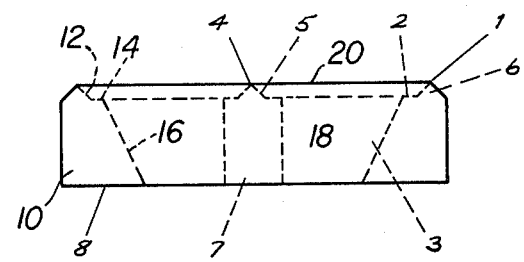
FIG. 12 is the same as FIG. 10 with dimensions deleted and different portions of the mold being identified.

FIGS. 5 through 15 and 17 through 19 depict one possible exemplary embodiment of the present invention wherein the molds are all circular in shape. As best shown in FIGS. 6, 10, and 12, the circular molds 10 have cutting edges or ridges 12 for cutting and pasting dough edges together. In accordance with the present invention, the circular molds are also provided with horizontal pasting faces 14 which combine the cutting edges 12 in pasting of the dough edges together. Further, in accordance with the present invention, the molds are provided with partial support walls 16 which form an inverted conical or frustum chamber 18 which is shown in phantom. In operation, a layer of dough is placed on the mold top 20. The desired filling is then placed on the dough directly over the inverted conical chamber 18. Next, a top layer of dough is placed on top of the filling and bottom dough layer. Finally, pressure is applied by way of a rolling pin, or other utensil or apparatus presenting a relatively flat surface across the mold top 20. As pressure is applied by way of the rolling pin or other surface, the dough and filling are forced downward into the inverted conical chamber 18 with the edges of the dough being pasted together along pasting faces 12 and auxiliary pasting faces 14. Further, the top of the cutting edge 22 cuts the dough layers to the desired circular shape as pressure is applied during the envelope formation. Due to the conical shape of the support walls 16, the completed dough envelopes do not pass through the mold. Therefore, the apparatus must be inverted and the dough envelopes knocked out onto the work table.

The particular dimensions and angles of inclination of various surfaces within the circular mold 10 are important. The preferred dimensions and angles are shown in FIGS. 6 and 10. The included angle of the cutting ridges may be varied between 60 degrees and 120 degrees. Preferably, the included angle is about 90 degrees to thereby provide an inclined cutting edge which is inclined at an angle of about 45 degrees to vertical as shown at 21.

The included angle of the support walls 16 may be varied between about 20 degrees and 60 degrees. Preferably, the included angle is between 30 degrees and 45 degrees.

The above-described included angles are important to insure adequate cutting, pasting and partial support of the dough envelopes. In addition, these particular angles are especially adapted to provide structures which are easily and therefore economically molded from plastic using presently available molding presses and machinery.

If non-circular dough envelopes containing filling are desired, a central knife blade such as that shown at 24 in FIG. 9 may be inserted diagonally across the circular opening defined by knife edge 22 of the basic circular mold 10. For preparing semi-circular envelopes, one knife blade 24 may be utilized. Two knife blades 24 may be extended at right angles across the mold top 20 if the preparation of quarter circle dough envelopes is desired. Of course, the shape of the dough envelopes is not limited to circular, semi-circular or quarter circular shapes and may be prepared in a wide variety of shapes such as those shapes produced by the exemplary molds shown in FIG. 16.

Figure 17:
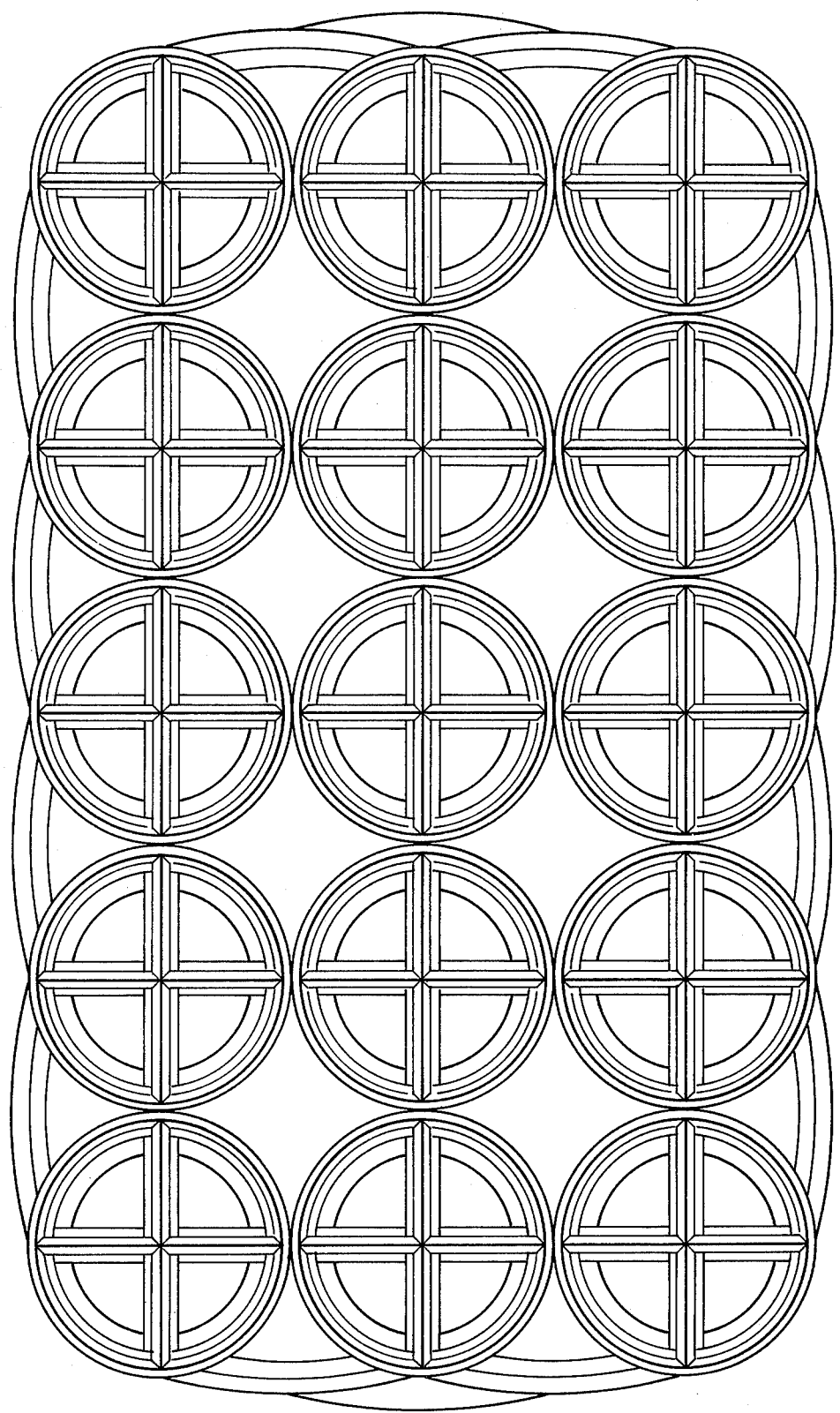
FIG. 17 is an exemplary frame structure showing a plurality of molds interconnected for mass production of dough envelopes.
Figure 18:
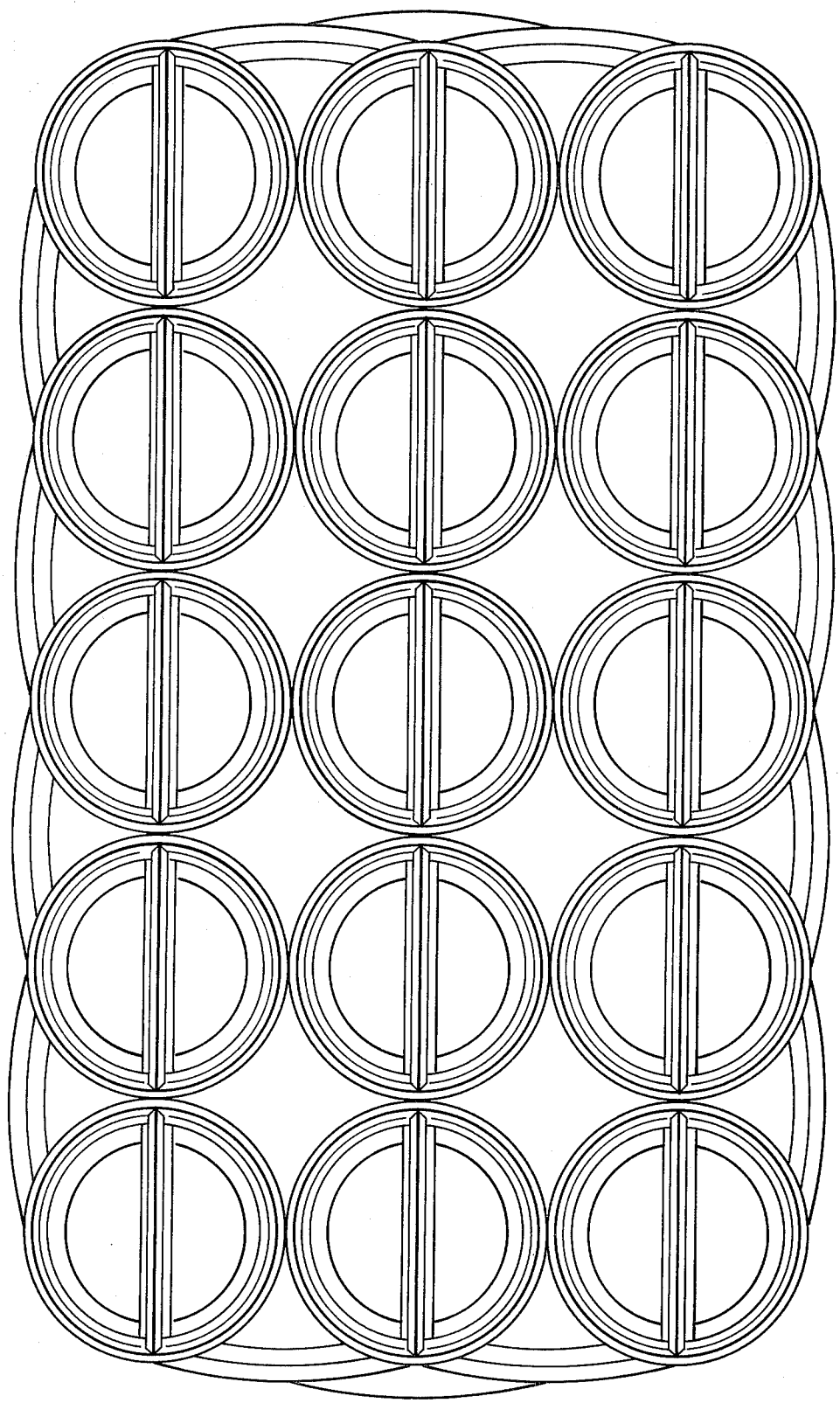
FIG. 18 is the same as FIG. 17 except that the individual models are provided with two knife cutting edges rather than one.
Figure 19:
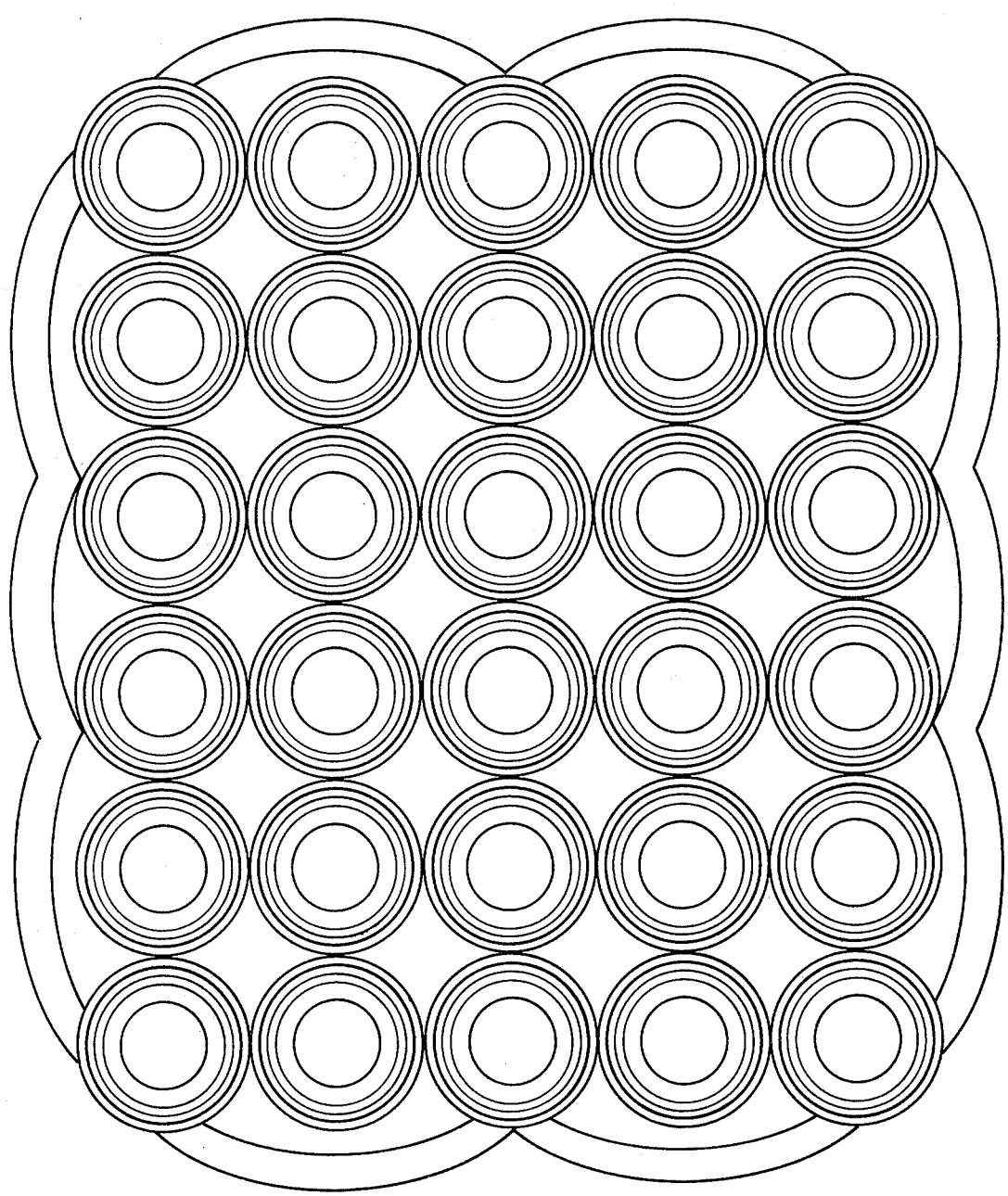
FIG. 19 is a frame structure having a plurality of circular molds for mass production of dough envelopes.

FIGS. 17, 18 and 19 show frame structures in accordance with the present invention having a plurality of molds for mass producing dough envelopes. The circular shaped molds are entirely suitable for preparing dough envelopes in accordance with the present invention; however, as will be noted, the circular shape of the individual molds will result in wasted space between each circular mold. Therefore, although the circular molds may be utilized in accordance with the present invention, the use of individual hexagonal mold structures to form an apparatus in accordance with the present invention is preferred. The following will be a detailed description of the preferred hexagonal embodiment of the present invention.

The preferred apparatus for making dough envelopes containing filling in accordance with the present invention is shown generally at 100 in FIG. 20. The apparatus includes a plastic injection molded frame structure 102. A plurality of individual hexagonal molds 104 form an integral part of the frame structure 102. The hexagonal molds 104 are connected together in a honeycomb-like structure whereby gaps between the molds, such as those in FIGS. 17, 18 and 19, are entirely eliminated. This desirably reduces dough waste. Integral support elements, such as legs 103 are provided along with rubber feet 105 for supporting the frame structure 102. Annular flange 107 extends around the perimeter of the structure 102 for support and strength.

The apparatus 100 is preferably made and molded from moldable plastic. Suitable apparatus may also be made from metal such as aluminum or stainless steel; however, the use of moldable plastic in producing the apparatus 100 is particularly desirable since it provides a lightweight, economical and conveniently mass-produced apparatus in accordance with the present invention. As best shown in FIG. 21, each individual hexagonal mold includes six cutting edges of ridges 106. The upper edge 108 of each cutting edge 106 provides a knife edge for cutting through the dough to provide individual hexagonally shaped dough envelopes. The cutting edges 106 serve the dual function of cutting and at the same time pasting together the dough envelopes. As previously discussed, the included angles of the cutting edges 106 should be between 60 degrees and 120 degrees and preferably about 45 degrees. The cutting edges 106 also include lower edges 110.

Circular or annular support surface 112 is provided for receiving and partially supporting the dough envelope during pasting of the dough layers together. The support wall top 114 has a larger diameter than the support wall bottom 116. This arrangement provides for an inverted conical surface or frustum which defines an inverted conical chamber or frustum chamber 118. The included angle of the support surface or walls 112 should be between 20 degrees and 60 degrees and preferably between 30 degrees and 45 degrees. As discussed previously, these angles are necessary for adequate dough envelope formation and are important in providing a structure which is easily molded from plastic.

Preferably, the perpendicular distance between the midpoints of the cutting edges lower edge 110 is equal to the diameter of the base or top of the support wall 114. Since the lower edge of the cutting edges 110 form a regular hexagon, and the support wall top 114 is annular in shape, horizontal pasting faces 120 are provided in each corner of the hexagon defined by the pasting face lower edges 110. These horizontal pasting surfaces 120 in combination with the cutting edges 106 provide strong pasting seals around the dough envelope edges and also impart an aesthetically pleasing and appetizing appearance to the dough envelopes.

Preferably, the dimensions of the apparatus include a round plastic molded structure 102 having a diameter of eleven inches. The angular flange 107 extends down ⅛ inch from the apparatus surface. Within the frame structure 102 are twenty-seven individual hexagonal molds 104. The plastic thickness throughout the apparatus is preferably about 3/32". The weight of the entire apparatus is about 6 to 7 ounces.

The hexagonal molds 104 have cutting edges 106 which are ⅞" in length and 3/16" wide. This provides for a perpendicular distance of 1½" between the center points of the tops 108 of the cutting edges in each mold. The diameter of the base 114 of the frusto-conical chamber is 1¼". The chamber is ¾" deep and has a diameter of 15/16" at it's bottom 116. The horizontal pasting faces 120 at their widest point are about ⅛" in width. The cutting edges 106 rise vertically about ⅛" above the plane of the frame structure 102. Twelve legs 103 are preferably provided extending ⅛" below the flange 107 with ⅛" thick rubber feet 105.

The operation and use of this preferred apparatus is the same as the previously described embodiments with dough and filling layers being applied followed by application of pressure to force the envelopes into the mold openings for cutting and pasting with resultant formation of individual dough envelopes.

It should be noted that the use of hexagonal molds for pastry making in general is not new. For example, R. J. Hewett disclosed a honeycomb structured biscuit cutter in his U.S. Pat. No. 337,329. The biscuit cutter disclosed in the Hewett patent, like many other prior art apparatus includes vertical walls which undesirably provide little if any dough support. The present invention, however, utilizes the known dough saving characteristics of a honeycomb structure in combination with a unique inclined dough support wall and unique cutting edges and horizontal pasting surfaces to provide an improved dough envelope containing filling.

Another prior art apparatus is disclosed by Gatti in his U.S. Pat. No. 3,026,822 issued on Mar. 27, 1962. This device also includes the drawback of suspending the envelope over an opening having vertical walls whereby the dough thickness and strength is weakened at the point where it first leaves the support of the pasting faces and is suspended over the mold opening.

The ravioli making apparatus disclosed by Marsilli in his U.S. Pat. No. 3,299,835 issued on Jan. 24, 1967 provides for complete support of the dough envelope during sealing of the edges; however, the entire dough surface is supported in a dish-shaped mold. This provision of entirely supporting the dough envelope provides for a uniform, aesthetically pleasing envelope, but does so at the expense of possible sticking of the dough layers to the mold.

In viewing the above prior art, it is apparent that many different devices and apparatus have been proposed for forming dough envelopes containing fillings. However, none of these apparatus have been able to produce a consistently uniform dough envelope having an aesthetically pleasing appearance and which further is structurally strong over its entire area including the area at and adjacent to the sealed edges of the envelope.

Other prior art dough envelope and miscellaneous pastry making apparatus which may be of interest are as follows: U.S. Pat. No. 3,872,757 issued to Hargadon; U.S. Pat. No. 4,112,127 issued to Popeil; U.S. Pat. No. 3,115,104 issued to Enoch et al.; U.S. Pat. No. 3,234,895 issued to Leiley; U.S. Pat. No. 1,477,693 issued to Clark; U.S. Pat. No. 1,945,755 issued to Scruggs; Australian Pat. No. 203,375 issued to Whalley et al. and the ravioli maker as advertised and sold by Cross Imports in their 1976–1977 catalog, (Cross Imports, 210 Hanover Street, Boston, Mass. 02113).

Having thus described exemplary embodiments of the present invention, it should be noted by those skilled in the art that within disclosures are exemplary only and that various other alternatives, adaptations and modifications may be made within the scope of the present invention. Accordingly, the present invention is not limited to the specific embodiments as illustrated herein.

What is claimed is:

1. An apparatus for forming regular dough envelopes containing filling comprising:
   a frame having a plurality of through dough-forming mold openings, each of said mold openings being in the form of a frustoconical chamber, the included angle of walls defining said frustoconical chamber being between about 20 degrees and 60 degrees;
   said frame having means for securing the edges of said dough products together, including generally horizontally extending pasting surfaces within each of said mold openings said chamber being of continuously reduced cross-section except for said pasting surfaces; and said frame further having means for cutting said dough envelopes apart, including sharp cutting ridges extending upwardly around said mold openings, said ridges terminating in cutting edges extending around each of said openings, said ridges being straight or curved and being being triangular in cross-section, with the included angle from said cutting edges being of the order of from about 60 degrees to 120 degrees, and said ridges being about ⅛ of and inch in height above said pasting surfaces.

2. An apparatus for forming regular dough envelopes containing filling comprising:
   a plastic injection molded frame having a plurality of dough-forming through mold openings, each of said mold openings being in the form of a frusto-conical chamber, the included angle of walls defining said frustoconical chamber being between about 20 degrees and 60 degrees;
   said frame including means for pasting the edges of said dough envelopes together, including generally horizontally extending pasting surfaces within each of said mold openings;
   said frame further including means for cutting said dough envelopes apart, including cutting ridges extending upwardly around said mold openings, said ridges being triangular in cross-section and terminating in straight sharp cutting edges forming regular hexagons around each of said openings, with the about 60 degrees to 120 degrees;
   said cutting edges being located about one-eight of an inch above said horizontal pasting surfaces; and
   said frame having a continuous flange extending downwardly at a slight downwardly directed angle around the periphery of said apparatus, said chamber being of continuously reduced cross-section except for said horizontally extending pasting surfaces.

3. An apparatus as defined in claim 2, wherein the horizontal cross-section through each of said frustoconical chambers is substantially circular, and wherein the transition from said hexagonal cutting edges to the circular configuration of said chamber is accomplished by horizontal pasting surfaces, which have a hexagonal outer configuration and a substantially circular inner edge.

4. An apparatus as defined in claim 2 further including integral supporting elements extending downwardly from the upper surface of said frame.

5. An apparatus as defined in claim 2 wherein said mold openings have a diameter of between 1 and 2 inches at their upper surface, and a lesser diameter of ¾ to 1½ inch at their lower extremities.

6. An apparatus as defined in claim 2 wherein said outer flange is substantially circular.

7. An apparatus according to claim 2 wherein the included angle of said frusto-conical chamber is between 30 degrees and 45 degrees.

8. An apparatus according to claim 2 wherein the included angle of the cutting edges is about 90 degrees.

9. In an apparatus for making dough envelopes containing filling, said apparatus including a frame having a plurality of molds, each mold having means including cutting ridges for cutting and pasting layers of dough together, said ridges being triangular in cross-section wherein the improvement comprises:
   support wall means associated with each said mold and forming an inverted conical chamber open at top and bottom and horizontal surfaces below said cutting edges for receiving and partially supporting the dough envelope during cutting and pasting of the dough layers together, said horizontal surfaces being within said chamber, and said cutting ridges being sharp and straight or curved and being spaced above said horizontal surfaces by about one-eighth of an inch, said chamber being of continuously reduced cross-section except for said horizontal surfaces.

10. An improved apparatus according to claim 9 wherein said inverted conical chamber is a frusto conical chamber.

11. An improved apparatus according to claim 10 wherein said cutting edges have an upper cutting edge and a lower edge, said upper cutting edge being tilted outward.

12. An improved apparatus according to claim 11 wherein said cutting edges are in the form of a hexagon for forming hexagonally shaped dough envelopes.

13. An improved apparatus according to claim 3 wherein the honeycomb structure is molded or stamped from plastic.

14. An improved apparatus according to claim 11 wherein the perpendicular distance between the midpoints of the cutting edge lower edges is equal to the diameter of the base of the inverted frustum chamber.

15. An improved apparatus according to claim 14 wherein horizontal pasting faces are provided in the corners of said hexagon between the base of the inverted frustum chamber and said cutting edge lower edges.

16. An improved apparatus according to claim 15 wherein said plurality of molds are interconnected to form a honeycomb structure whereby loss of dough during making of dough envelopes is minimized.

* * * * *